United States Patent
Gao

(10) Patent No.: US 10,630,629 B2
(45) Date of Patent: Apr. 21, 2020

(54) SCREEN DISPLAY METHOD, APPARATUS, TERMINAL, AND STORAGE MEDIUM

(71) Applicant: TENCENT TECHNOLOGY (SHENZHEN) COMPANY LIMITED, Shenzhen (CN)

(72) Inventor: Xiaoyu Gao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/410,245

(22) Filed: May 13, 2019

(65) Prior Publication Data

US 2019/0268294 A1 Aug. 29, 2019

Related U.S. Application Data

(63) Continuation of application No. PCT/CN2018/071732, filed on Jan. 8, 2018.

(30) Foreign Application Priority Data

Jan. 23, 2017 (CN) .......................... 2017 1 0050713

(51) Int. Cl.
*H04W 24/00* (2009.01)
*H04L 12/58* (2006.01)
(Continued)

(52) U.S. Cl.
CPC .......... *H04L 51/20* (2013.01); *G06F 3/04845* (2013.01); *G06F 9/451* (2018.02);
(Continued)

(58) Field of Classification Search
None
See application file for complete search history.

(56) References Cited

U.S. PATENT DOCUMENTS

2013/0326366 A1* 12/2013 Choi ...................... H04W 4/12
715/752
2016/0294958 A1* 10/2016 Zhang .................. G01C 21/005

FOREIGN PATENT DOCUMENTS

CN 102440011 A 5/2012
CN 103220207 A 7/2013
(Continued)

OTHER PUBLICATIONS

The World Intellectual Property Organization (WIPO) International Search Report for PCT/CN2018/071732 dated Apr. 2, 2018 6 Pages (including translation).

(Continued)

*Primary Examiner* — Erika A Washington
(74) *Attorney, Agent, or Firm* — Anova Law Group, PLLC

(57) ABSTRACT

A screen display method, an apparatus, a terminal, and a storage medium are provided. The method includes: receiving, by a terminal, an enabling instruction for activating a location sharing function; and generating, by the terminal, a location sharing layer according to the enabling instruction. The location sharing layer is used for sharing and displaying, on a map, a geographical location of at least one user in a dialogue session. The method also includes displaying, by the terminal, the location sharing layer as a background display layer of a session screen corresponding to the dialogue session. The session screen includes a message display layer and the background display layer, the message display layer being located above the background display layer, and the message display layer being used for displaying a session message between a local user of the terminal and a remote user participated in the dialogue session.

20 Claims, 11 Drawing Sheets

(51) Int. Cl.
*G06F 3/0484* (2013.01)
*G06F 9/451* (2018.01)
*G06F 9/54* (2006.01)

(52) U.S. Cl.
CPC ............ *G06F 9/543* (2013.01); *H04L 51/046* (2013.01); *H04L 51/063* (2013.01); *G06F 2203/04804* (2013.01); *G06F 2203/04806* (2013.01)

(56) References Cited

FOREIGN PATENT DOCUMENTS

| | | |
|---|---|---|
| CN | 104426749 A | 3/2015 |
| CN | 104618854 A | 5/2015 |
| CN | 104765522 A | 7/2015 |
| CN | 105549819 A | 5/2016 |
| CN | 105847110 A | 8/2016 |
| CN | 106302129 A | 1/2017 |
| CN | 106708538 A | 5/2017 |

OTHER PUBLICATIONS

The State Intellectual Property Office of the People's Republic of China (SIPO) Office Action 1 for 201710050713.2 dated Mar. 1, 2019 9 Pages (including translation).

\* cited by examiner

SCREEN DISPLAY METHOD, APPARATUS, TERMINAL, AND STORAGE MEDIUM

RELATED APPLICATIONS

This application is a continuation application of PCT Patent Application No. PCT/CN2018/071732, filed on Jan. 8, 2018, which claims priority to Chinese Patent Application No. 201710050713.2, entitled "SCREEN DISPLAY METHOD AND APPARATUS" filed with the China National Intellectual Property Administration on Jan. 23, 2017, the entire contents of both of which are incorporated herein by reference.

FIELD OF TECHNOLOGY

Embodiments of the present disclosure relate to the field of computer technologies, and in particular, to a screen display method, an apparatus, a terminal, and a storage medium.

BACKGROUND OF THE DISCLOSURE

Currently, an instant messaging client provides a location sharing function, and the location sharing function is used for sharing a real-time geographical location at which a user is currently located to another user.

A typical location sharing function implementation method is as follows: A user A opens a session screen related to a user B on an instant messaging client, and triggers an enabling instruction for enabling a location sharing function in a menu provided on a chat session screen; after receiving the enabling instruction, the instant messaging client leaves the chat session screen and jump to a location sharing screen; and the instant messaging client displays a real-time geographical location of the user A on the location sharing screen. After the location sharing function is enabled, the user A can only view the location sharing screen, and if the user A still needs to chat with the user B on the session screen to, the user A needs to exit the location sharing screen to re-enable the instant messaging client to display the session screen.

The location sharing function is generally applied to a scenario in which the user A and the user B make an appointment to meet each other. In such a scenario, the user A not only needs to view real-time geographical locations of the two parties on the location sharing screen, but also needs to keep in touch with the user B by using the session screen. Therefore, the user A needs to continuously switch between the location sharing screen and the session screen. This consumes many user operations and causes low efficiency of instant chatting between the user A and the user B on the session screen.

SUMMARY

To resolve the problem in the related technologies that a terminal consumes many resources because the terminal switches between a location sharing screen and a session screen back and forth, embodiments of the present disclosure provide a screen display method, an apparatus, a terminal, and a storage medium. The technical solutions are as follows:

According to one aspect, provided is a screen display method, applied to a terminal. The method includes: receiving, by the terminal, an enabling instruction for activating a location sharing function; and generating, by the terminal, a location sharing layer according to the enabling instruction. The location sharing layer is used for sharing and displaying, on a map, a geographical location of at least one user in a dialogue session. The method also includes displaying, by the terminal, the location sharing layer as a background display layer of a session screen corresponding to the dialogue session. The session screen includes a message display layer and the background display layer, the message display layer being located above the background display layer, and the message display layer being used for displaying a session message between a local user of the terminal and a remote user participated in the dialogue session.

According to another aspect, provided is a screen display apparatus, including a memory and a processor coupled to the memory. The processor is configured to receive an enabling instruction for activating a location sharing function; and generate a location sharing layer according to the enabling instruction. The location sharing layer is used for sharing and displaying, on a map, a geographical location of at least one user in a dialogue session. The processor is also configured to display the location sharing layer as a background display layer of a session screen corresponding to the dialogue session. The session screen includes a message display layer and the background display layer, the message display layer being located above the background display layer, and the message display layer being used for displaying a session message between a local user of the terminal and a remote user participated in the dialogue session.

According to another aspect, a computer-readable storage medium is provided. The computer-readable storage medium stores a program instruction, and when being executed by a processor, the program instruction cause the processor to perform: receiving an enabling instruction for activating a location sharing function; and generating a location sharing layer according to the enabling instruction. The location sharing layer is used for sharing and displaying, on a map, a geographical location of at least one user in a dialogue session. The program instructions also cause the processor to perform: displaying the location sharing layer as a background display layer of a session screen corresponding to the dialogue session. The session screen includes a message display layer and the background display layer, the message display layer being located above the background display layer, and the message display layer being used for displaying a session message between a local user of the terminal and a remote user participated in the dialogue session.

Beneficial effects of the technical solutions provided in the embodiments of the present disclosure include:

When a location sharing function is enabled, a generated location sharing layer is displayed as a background display layer of a session screen, where a message display layer of the session screen is above the background display layer, so that an instant messaging client can simultaneously display a geographical location on the location sharing layer and a session message on the message display layer, and a problem that a terminal consumes many resources when the terminal can display only a location sharing screen or the session screen and needs to switch a current screen back and forth and can be resolved. Therefore, the resources of the terminal can be saved, and a user does not need to continuously switch between the location sharing screen and the session screen, thereby improving efficiency of instant chatting by the user on the session screen.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and a person of ordinary skill in the technology may still derive other drawings from these accompanying drawings without creative efforts.

DESCRIPTION OF EMBODIMENTS

Figure 1:
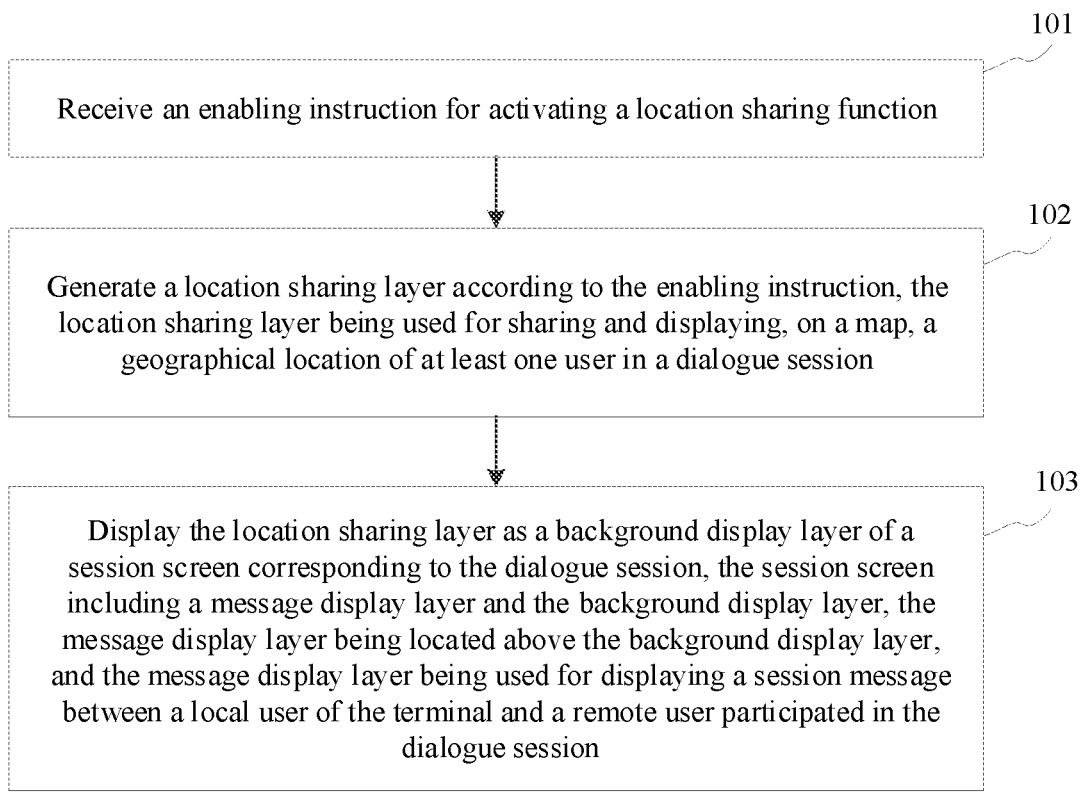
FIG. 1 is a flowchart of a screen display method according to an embodiment of the present disclosure.

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the embodiments of the present disclosure. On the contrary, the implementations are merely examples of apparatuses and methods that are described in detail in the appended claims and that are consistent with some aspects of the embodiments of the present disclosure.

After receiving an enabling instruction, an instant messaging client enables a session screen to jump to a location sharing screen, that is, instead of displaying the session screen, a terminal displays the location sharing screen only. In this case, after a location sharing function of the terminal is enabled, a session user can view the location sharing screen only. If the session user further needs to chat with another session user still by using the session screen, the session user needs to exit the location sharing screen, and re-enable the instant messaging client to display the session screen. In such a process, the terminal at least needs to switch a current screen twice: switching the session screen to the location sharing screen; and switching the location sharing screen to the session screen. The session user at least needs to switch the location sharing layer once. This causes a problem that the terminal consumes many resources and the session user has low efficiency of chatting by using the session screen. Based on the technical problem, embodiments of the present disclosure provide a screen display method and an apparatus. The method includes the following technical solution. The instant message (IM) client may maintain a session screen displaying instant dialogue messages between a user of the local terminal and one or more other IM contacts (i.e., remote users participating in the dialogue session). The session screen may include general control elements such as: an input box for the local user to enter a new message, an icon for recording/capturing a multimedia content, an icon for activating location sharing function, etc. As the local user completes composing a new message or the IM client receives a new message from a remote user, the session screen may display such new message(s). When the location sharing function is enabled, a location sharing layer is displayed as a background display layer of the session screen. In this case, the session user can not only view, on the session screen, a real-time geographical location that is of a user and that is provided on the location sharing layer, but also chat with others on the session screen. Therefore, the resources of the terminal are saved, and efficiency of chatting by the user by using the session screen is also improved.

According to the method provided in the embodiments of the present disclosure, an execution body of steps may be a terminal, and the terminal may be a mobile phone, a tablet computer, an electronic book reader, a Moving Picture Experts Group Audio Layer III (MP3) player, a Moving Picture Experts Group Audio Layer IV (MP4) player, a laptop portable computer, a desktop computer, and the like. This is not limited in the embodiments. An instant messaging client is installed on the terminal, and the instant messaging client provides a location sharing function. The location sharing function is a function of sharing, in the instant messaging client, a geographical location of at least one session user in a session group to another session user in the session group. Optionally, a session user displayed in a sharing manner is a session user that has already enabled the location sharing function.

FIG. 1 is a flowchart of a screen display method according to an embodiment of the present disclosure. The method may include the following steps.

Step 101. Receive an enabling instruction for activating a location sharing function.

The enabling instruction is an instruction triggered by an enabling operation performed on a location sharing control on a session screen. Optionally, the location sharing control may be an enabling option that is of the location sharing function and that is located in an extended content bar (e.g., control panel) on the session screen, or may be a location sharing message on the session screen. The extended content bar is used to present an extended function of an instant messaging client. The location sharing message is a message sent by at least one session user on the session screen, and used for enabling the location sharing function at a local end. For example, when a remote user activates location sharing function using the IM client at his/her remote terminal, the local terminal may be informed and the session screen of the local terminal may display the location sharing message in an area designated for presenting chat dialogue messages. The location sharing message may that the remote user has started sharing his/her location and allow the local user to tap to view the location of the remote user. The enabling option of the location sharing function of the local terminal is activated when the local user selects the location sharing message on the session screen. The IM client at the local terminal may also request the local user to choose whether to share his/her own location when activating the location sharing function.

In an example, when the location sharing control is the enabling option that is of the location sharing function and that is located in the extended content bar, the receiving, by a terminal, an enabling instruction for enabling a location sharing function includes: receiving a viewing operation acting on the session screen, and displaying the extended content bar according to the viewing operation; and receiving the enabling instruction acting on the enabling option corresponding to the location sharing function and located in the extended content bar. Optionally, when the terminal receives the enabling instruction activated by the local user, if other terminals (i.e., IM clients of participating remote users) on the session screen have not enabled the location sharing function, the terminal sends a location sharing message to the terminals used by other session users in a session group.

Figure 2:
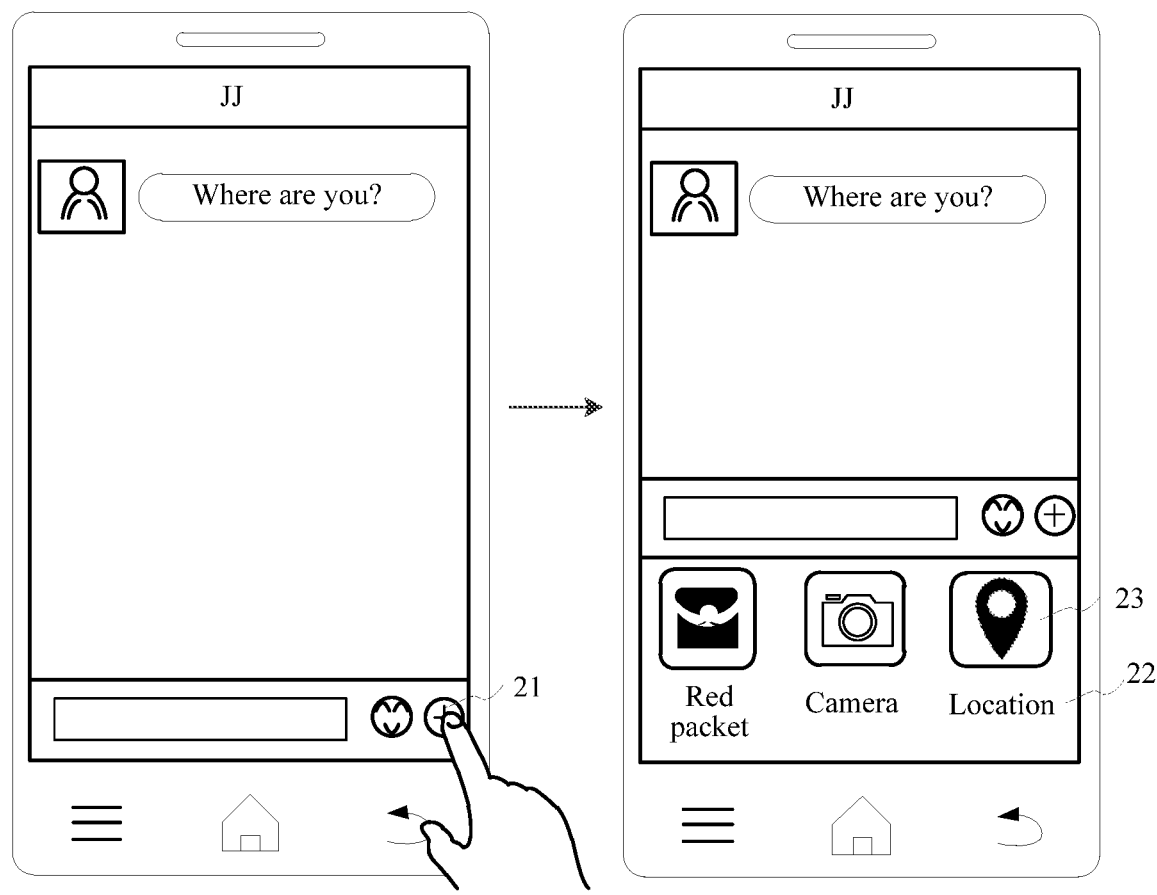
FIG. 2 is a schematic diagram of a session screen according to an embodiment of the present disclosure.

Referring to a session screen shown in FIG. 2, after the session user taps a control 21 that is on the session screen and that is used for displaying the extended content bar, the terminal presents the extended content bar 22. The terminal receives an enabling instruction acting on an enabling option 23 that is of the location sharing function and that is in the extended content bar 22.

In another example, when the location sharing control is a location sharing message on the session screen, the terminal receives the enabling instruction for enabling the location sharing function, including: receiving an enabling instruction acting on the location sharing message on the session screen. It should be noted that at least one session user on the session screen has enabled the location sharing function.

Figure 3:
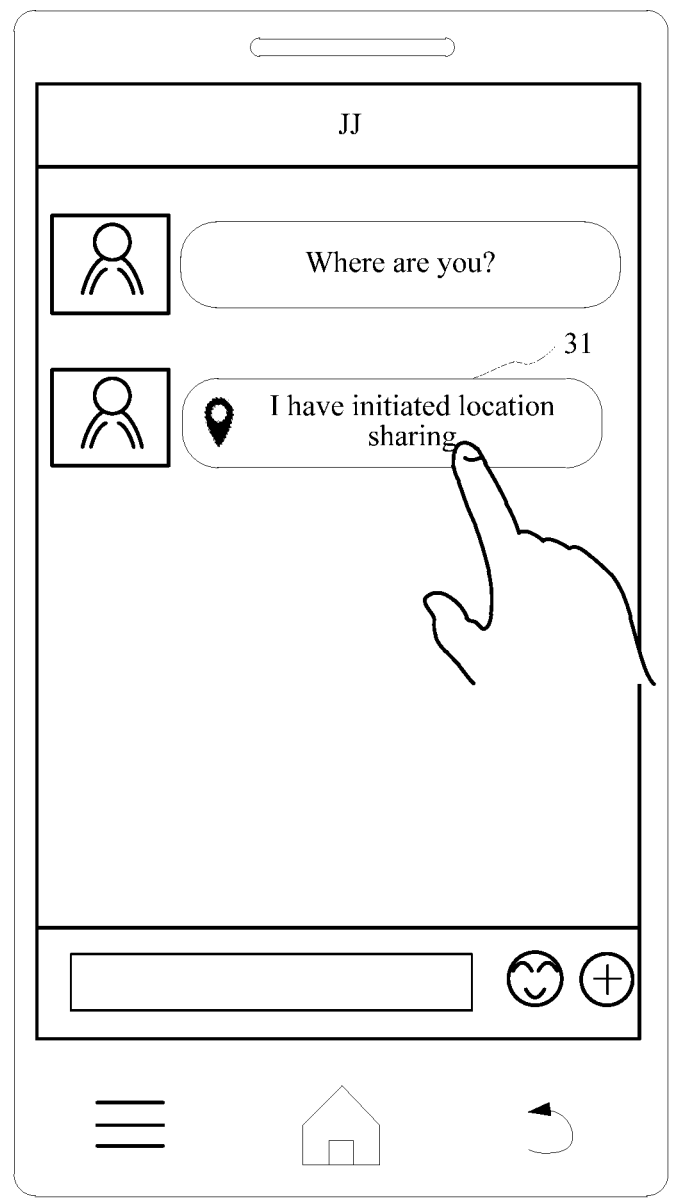
FIG. 3 is a schematic diagram of a session screen according to another embodiment of the present disclosure.

Referring to a session screen shown in FIG. 3, the terminal receives an enabling instruction acting on a location sharing message 31.

Step 102. Generate a location sharing layer according to the enabling instruction, the location sharing layer being used for sharing and displaying, on a map, a geographical location of at least one user in a dialogue session.

The location sharing layer is used for sharing and displaying the geographical location of the local session user and/or the geographical location of the another session user on a two-dimensional map or a three-dimensional map. Optionally, the geographical location is a real-time geographical location, and the real-time geographical location is a geographical location obtained by locating the terminal in real time. Optionally, the geographical location is a static geographical location, and the static geographical location is a geographical location obtained by enabling the location sharing function to locate the terminal. Optionally, to identify the geographical location of the local session user and/or the geographical location of the another session user, the location sharing layer further includes an identifier corresponding to the geographical location of the local session user (for example, a profile photo of the local session user), and/or an identifier corresponding to the geographical location of the another session user (for example, a profile photo of the another session user).

The terminal may generate the location sharing layer by invoking a page generation control, where the page generation control is used for generating the location sharing layer according to a map obtained by a map obtaining interface. The page generation control may be WebView or View. The map obtaining interface may be a MapQuest JavaScript Application Programming Interface (API)), a Google Maps JavaScript API, or a Bing Maps JavaScript API. This is not limited in the disclosed embodiments.

Step 103. Display the location sharing layer as a background display layer of a session screen corresponding to the dialogue session, the session screen including a message display layer and the background display layer, the message display layer being located above the background display layer, and the message display layer being used for displaying a session message between the local user (i.e., a user of the local terminal) and the another session user (e.g., a remote user participating in the dialogue session).

Figure 4:
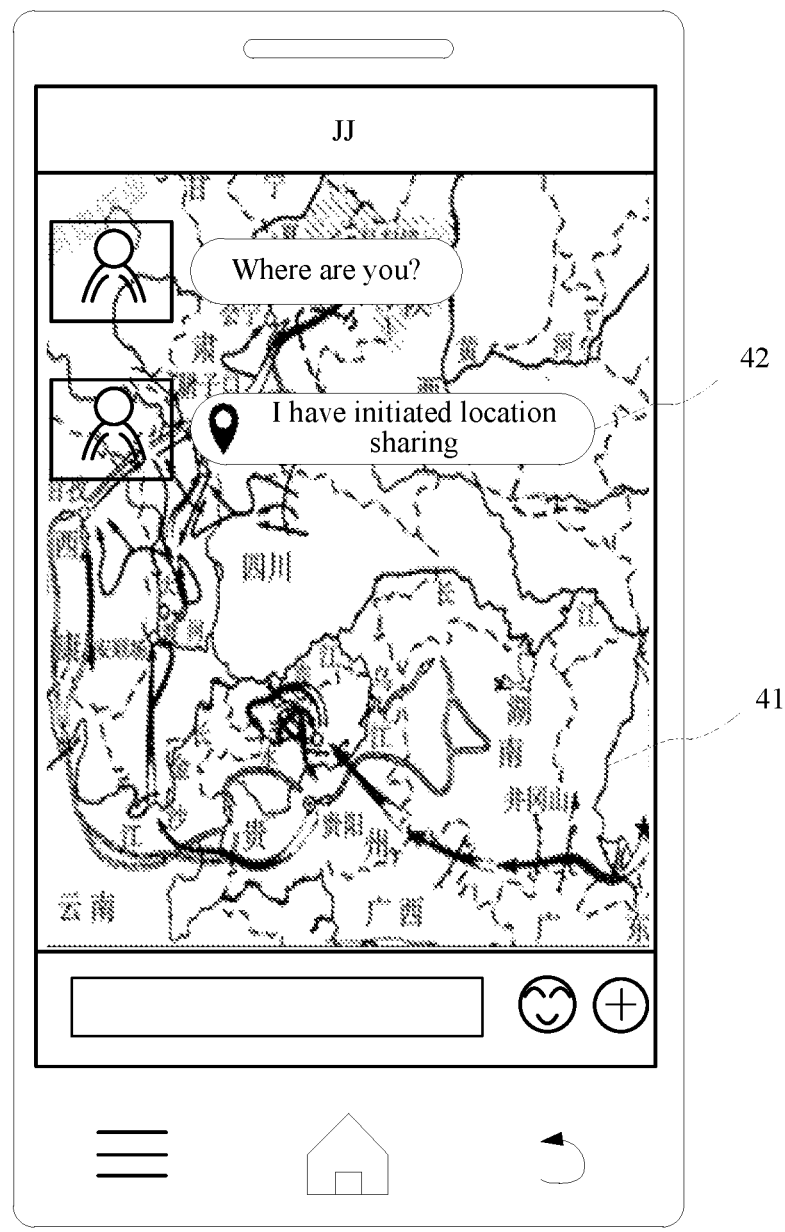
FIG. 4 is a schematic diagram of a session screen according to another embodiment of the present disclosure.

In one embodiment, the location sharing layer is displayed as the background display layer of the session screen. The background display layer of the session screen is located under the message display layer, so that the terminal can simultaneously display the session message and the map. For example, as shown in FIG. 4, the message display layer includes elements such as a top bar indicating participants of the current dialogue session (e.g., a contact name or a group discussion name), a message area displaying chat messages, and input bar showing an input box and other control functions. In some embodiments, when the background display layer is located beneath the message display layer, only the message area not covered by chat messages is transparent so that the map at the background display layer is visible to the user. In some embodiments, the chat messages may be set at certain transparency level (e.g., 50%) such that the map at the background display layer is partially visible in areas covered by the chat messages. In this way, the session user can not only view the map, but also chat with the another session user, so that the resources of the terminal are saved, and efficiency of chatting by the session user by using the session screen is improved.

The message display layer may be a transparent layer, and when there is a session message on the session screen, the session message is attached to the transparent layer. Alternatively, the message display layer may include fragments corresponding to each display element, for example, a fragment corresponding to a session message, a fragment corresponding to a session title, and a fragment corresponding to an input box. The fragments are used for independently deploying each display element on the session screen.

The displaying, by the terminal, the location sharing layer as a background display layer of a session screen includes: invoking a preset screen setting interface, the screen setting interface being used for setting the background display layer of the session screen; and setting, by using the screen setting interface, the location sharing layer as the background display layer for displaying. The screen setting interface may be a ListView interface, an ImageView interface, a ScrollView interface, and the like. This is not limited by the disclosed embodiment.

Referring to a session screen shown in FIG. 4, the terminal displays a location sharing layer 41 as the background display layer on the session screen, and a session message 42 (or all session/chat messages) on the message display layer is above the location sharing layer 41.

In conclusion, according to the method provided in some embodiments, when a location sharing function is enabled, a generated location sharing layer is displayed as a background display layer of a session screen, where a message display layer of the session screen is above the background display layer, so that an instant messaging client can simultaneously display a geographical location on the location sharing layer and a session message on the message display layer, and a problem that a terminal consumes many resources when the terminal can display only a location sharing screen or the session screen and needs to switch a current screen back and forth can be resolved. Therefore, the resources of the terminal can be saved, and a session user does not need to continuously switch between the location sharing screen and the session screen, thereby improving efficiency of instant chatting by the session user on the session screen.

Optionally, the location sharing layer is located on the background display layer of the session screen. In this case, the session user can view only a map provided on the location sharing layer, and cannot perform user operations such as zooming in, zooming out, and dragging on the map. To enable that the session user can perform the foregoing user operations on the map, the location sharing layer needs to be displayed above the message display layer of the session screen.

Figure 5:
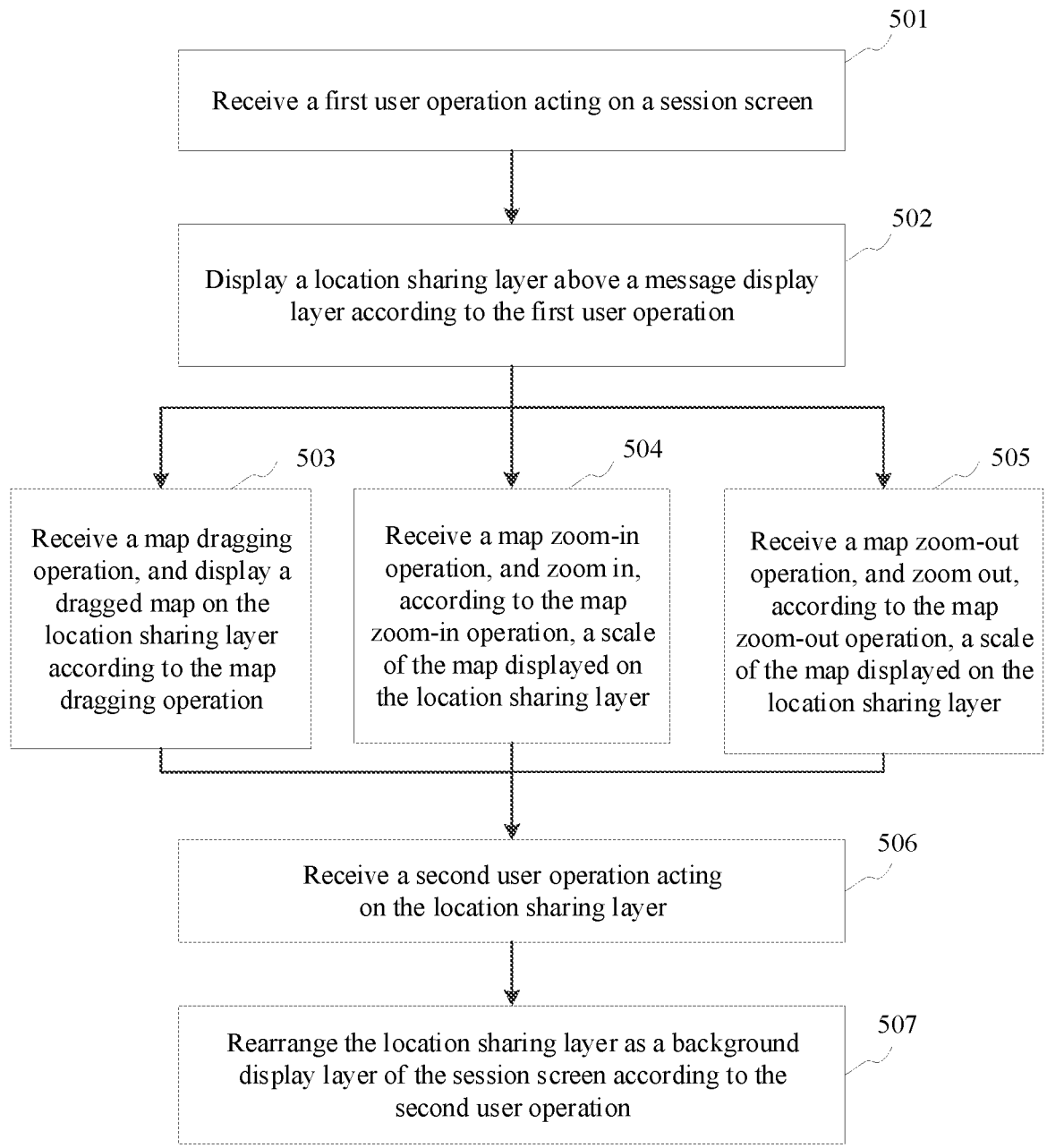
FIG. 5 is a flowchart of a screen display method according to another embodiment of the present disclosure.

FIG. 5 is a flowchart of a screen display method according to an embodiment of the present disclosure. After step 103, the method may include the following steps.

Step 501. Receive a first user operation acting on a session screen.

The first user operation is used for triggering a terminal to display a location sharing layer above a message display layer. The first user operation may be a tap operation, a touch and hold operation, and the like. This is not limited by the disclosed embodiments.

In an example, the first user operation is a user operation acting on an empty area of the message display layer, and the empty area is an area that is of the message display layer and that is not covered by the session message (e.g., not covered by any session message).

It is assumed that the session screen is shown in FIG. 4 after the terminal enables the location sharing function. If a session user needs to display a location sharing layer 41 in FIG. 4 on the message display layer, the session user double-taps the empty area (an area not covered by a session message 42), and the terminal receives the first user operation acting on the empty area.

In another example, the first user operation is a user operation acting on the background display layer. When the message display layer is a transparent layer, the terminal transparently transmits a user operation acting on the message display layer, to the background display layer by using a transparently transmitted event, and correspondingly, the background display layer receives the first user operation. The transparently transmitted event is preset in the terminal. For example, the transparently transmitted event is triggered when the message display layer does not receive another tap operation within 300 ms (milliseconds) after receiving a tap operation. When the message display layer is composed of fragments corresponding to each display element, the background display layer may directly receive a first user operation that acts on the background display layer and does not act on the display element.

Step 502. Display a location sharing layer above a message display layer according to the first user operation.

Manners of displaying, by the terminal, the location sharing layer above the message display layer include but are not limited to the following manners.

In a manner, the terminal hides all display elements on the message display layer under the background display layer according to the first user operation.

When the message display layer is a transparent layer, hiding all the display elements on the message display layer under the background display layer means setting the message display layer under the background display layer. When the message display layer is a fragment corresponding to each display element, hiding all the display elements on the message display layer under the background display layer means setting all the display elements under the background display layer.

The terminal may hide all the display elements on the message display layer under the background display layer by using a screen setting interface, the screen setting interface is used for setting the message display layer of the session screen, and the screen setting interface may be a ListView interface, a ScrollView interface, and the like. This is not limited by the disclosed embodiments.

In another manner, the terminal places/arranges the location sharing layer above the message display layer according to the first user operation.

The terminal may place the location sharing layer above the message display layer by using a page generation control, and the page generation control may be WebView, View, and the like. This is not limited by the disclosed embodiments.

Figure 6:
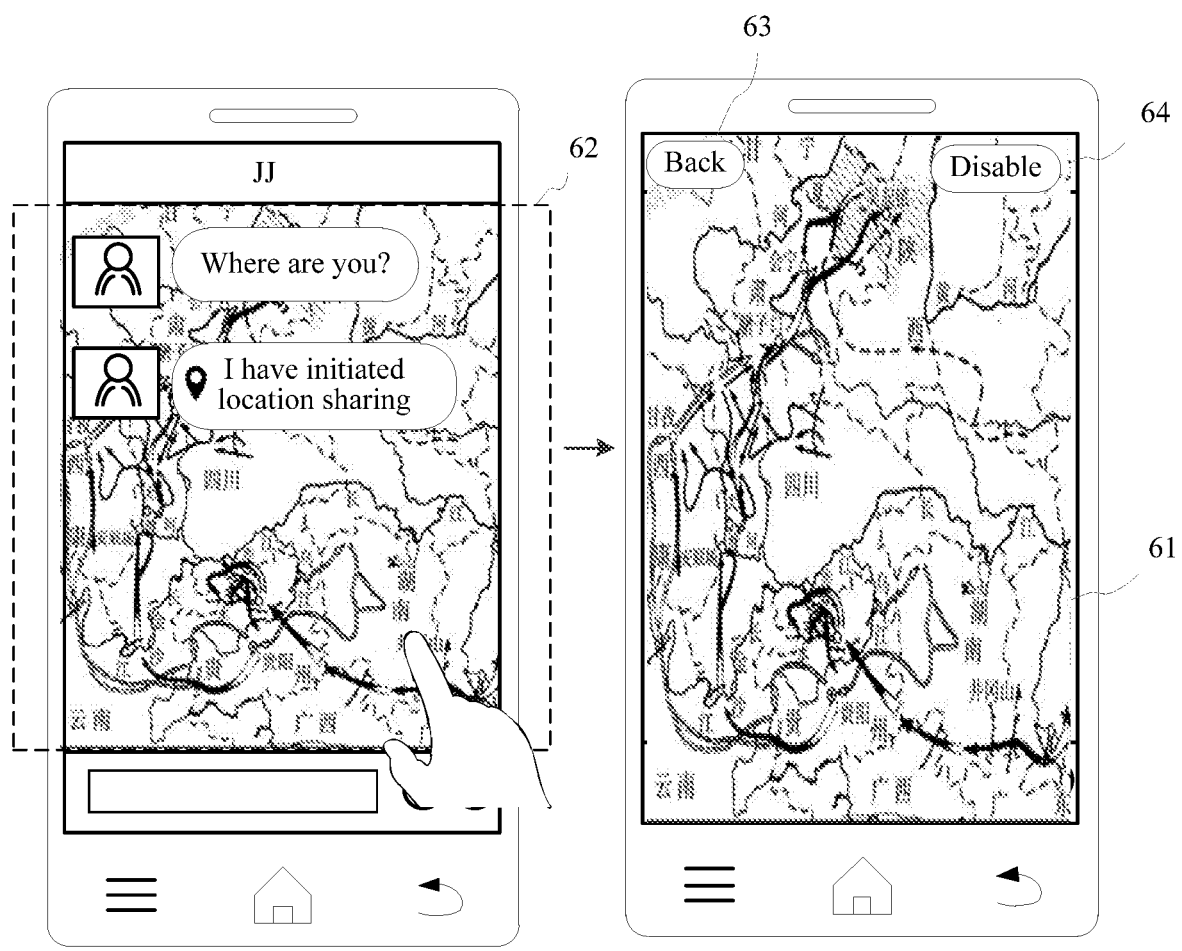
FIG. 6 is a schematic diagram of a session screen according to another embodiment of the present disclosure.

Refer to a user screen shown in FIG. 6 when the location sharing layer is displayed above the message display layer. It can be learned from FIG. 6 that, when the terminal receives the first user operation, a location sharing layer 61 covers a session message on the session screen, and in this case, the user can view only a map provided on the location sharing layer 61. It should be noted that, an example in which the location sharing layer covers the entire session screen is described in FIG. 6, and during actual implementation, the location sharing layer may cover only an area that is in the session screen and that is used for presenting the session message, for example, a display area included in an area 62 in FIG. 6. This is not limited by the disclosed embodiments. In some embodiments, when the location sharing layer is on top and a new instant message (e.g., sent by another participant in the current dialogue session) is received by the local IM client, the terminal may display the new message on top of the map (e.g., above the location sharing layer) for a certain period of time (e.g., the user may preset the period, such as 2 seconds). In this way, the user does not miss any new messages while having a full view of the location sharing map.

Optionally, when a map dragging operation is received, step 503 is performed; and/or when a map zoom-in operation is received, step 504 is performed; and/or when a map zoom-out operation is received, step 505 is performed.

Step 503. Receive a map dragging operation, and display a dragged map on the location sharing layer according to the map dragging operation, and perform step 506.

The location sharing layer located at a topmost layer is in a running state, and in this case, the session user may perform human computer interaction with the terminal by using the location sharing layer. The map dragging operation is used for triggering the terminal to display a map not displayed on a current location sharing layer, and the map dragging operation may be a dragging operation in a same direction. A form of the map dragging operation is not limited by the disclosed embodiments. When the terminal receives a map dragging operation acting on the location sharing layer, the terminal displays a dragged map according to a dragging direction and a dragging distance of the map dragging operation performed by the session user.

Assuming that the session user performs a map dragging operation on the location sharing layer, and a dragging direction of the map dragging operation is rightward and a dragging distance indicates that an image moves by 1 cm, the terminal displays, on the location sharing layer, the dragged map by moving the map rightward by 1 cm.

Step 504. Receive a map zoom-in operation, zoom in, according to the map zoom-in operation, a scale of the map displayed on the location sharing layer, and perform step 506.

The map zoom-in operation is used for triggering the terminal to display, at a larger scale, the map displayed on the current location sharing layer. The map zoom-in operation may be a dragging operation, a double-tap operation, and the like. This is not limited by the disclosed embodiments. When the terminal receives the map zoom-in operation acting on the location sharing layer, the terminal zooms in the scale of the map according to an operation distance of the map zoom-in operation performed by the session user, and displays the map on the location sharing layer according to the zoomed-in scale.

It is assumed that the terminal displays the map on the location sharing layer at a scale of 1:100 thousand. If the session user performs a map zoom-in operation on the location sharing layer, and a zoom-in multiple indicated by an operation distance of the map zoom-in operation is 10 times, the terminal displays the zoomed-in map on the location sharing layer at a scale of 1:10 thousand.

Step 505. Receive a map zoom-out operation, and zoom out, according to the map zoom-out operation, a scale of the map displayed on the location sharing layer.

The map zoom-out operation is used for triggering the terminal to display, at a smaller scale, the map displayed on the current location sharing layer. The map zoom-out operation may be a dragging operation, a double-tap operation, and the like. This is not limited by the disclosed embodiments. When the terminal receives the map zoom-out operation acting on the location sharing layer, the terminal zooms out the scale of the map according to an operation distance of the map zoom-out operation performed by the session user, and displays the map on the location sharing layer according to the zoomed-out scale.

It is assumed that the terminal displays the map on the location sharing layer at a scale of 1:100 thousand. If the session user performs a map zoom-out operation on the location sharing layer, and a zoom-out multiple indicated by an operation distance of the map zoom-out operation is 10 times, the terminal displays the zoomed-out map on the location sharing layer at a scale of 1:1 million.

It should be noted that, to ensure that the terminal can correctly respond to an operation performed by the session user, the map dragging operation, the map zoom-in operation, and the map zoom-out operation need to correspond to different operation manners. For example, the map dragging operation corresponds to a dragging operation in one direction, the map zoom-in operation corresponds to a dragging operation of moving from two sides to the middle in same duration, the map zoom-out operation corresponds to a dragging operation of moving from the middle to two sides in same duration.

Step 506. Receive a second user operation acting on the location sharing layer.

The second user operation is used for triggering the terminal to re-display the location sharing layer as the background display layer of the session screen, so that the session user can chat with another session user by using the session screen while viewing the map. The second user operation may be an operation of tapping a return option set on the location sharing layer, for example, an operation of tapping a "return" option 63 in FIG. 6 or a touch and hold operation. This is not limited by the disclosed embodiments.

Step 507. Re-display the location sharing layer as a background display layer of the session screen according to the second user operation.

Assuming that the session user taps the "return" option 63 in FIG. 6, the terminal displays the session screen shown in FIG. 4.

Optionally, the terminal may further receive a third user operation acting on the location sharing layer, and disable/stop the location sharing function and disable the location sharing layer according to the third user operation. The third user operation may be an operation of tapping a disable option set on a location sharing layer, for example, an operation of tapping a "disable" option 64 in FIG. 6 or a touch and hold operation. This is not limited by the disclosed embodiments. It should be noted that, the third user operation is an operation different from the second user operation, and a difference may be reflected in different acting positions or different operation execution manners. This is not limited by the disclosed embodiments.

Optionally, the terminal may perform any one or more steps of steps 503 to 505 or skip performing steps 503 to 505, and when performing at least two of steps 503 to 505, the terminal may perform the at least two steps in any order. This is not limited by the disclosed embodiments.

In conclusion, according to the method in some embodiments, when the first user operation acting on the session screen is received, the location sharing layer is displayed above the message display layer, so that the session user may operate the map displayed on the location sharing layer, and the terminal displays, on the location sharing layer, the map that the session user needs to view, thereby ensuring that the terminal meets a requirement of viewing the map by the session user.

Optionally, when enabling the location sharing function, the terminal may divide a current screen into two display areas. A first display area is used for displaying the session screen, and the second display area is used for displaying the location sharing screen. The first display area and the second display area may have a same area or different areas. The first display area may be above the second display area, or may be below the second display area. A division manner of the first display area and the second display area is not limited by the disclosed embodiments.

Optionally, the terminal enables the location sharing function according to the enabling instruction. For details of an enabling manner, refer to the description of step 101. Details are not described again in this embodiment.

Figure 7:
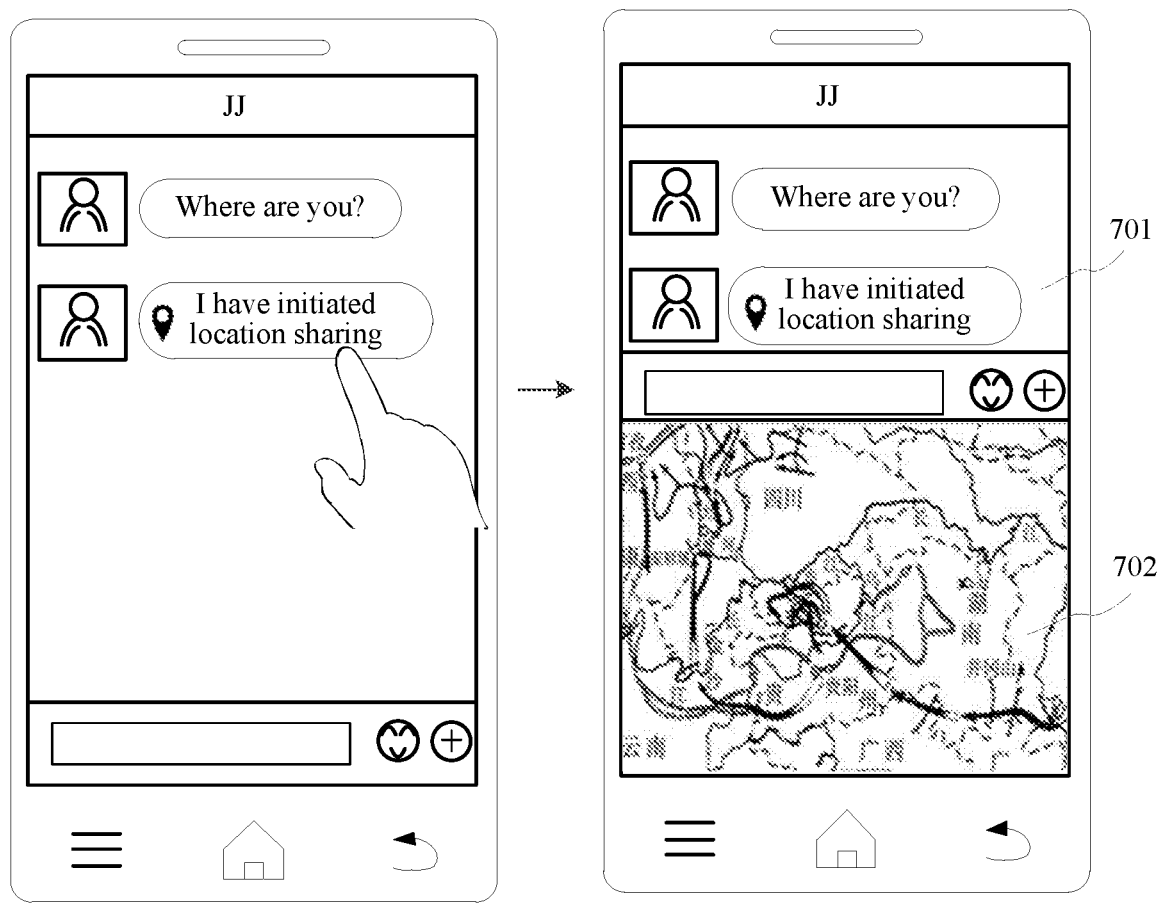
FIG. 7 is a flowchart of a screen display method according to another embodiment of the present disclosure.

Referring to FIG. 7, after enabling the location sharing function according to the enabling instruction, the terminal displays the first display area 701 and the second display area 702. The first display area 701 displays the session screen, and the second display area 702 displays the location sharing screen.

When the terminal divides the current screen into two display areas, and the two display areas respectively display the session message and the map, the session user can not only perform chatting by using the session screen, but also view and operate the map without performing the first user operation, thereby improving efficiency of operating the map by the session user.

Figure 8:
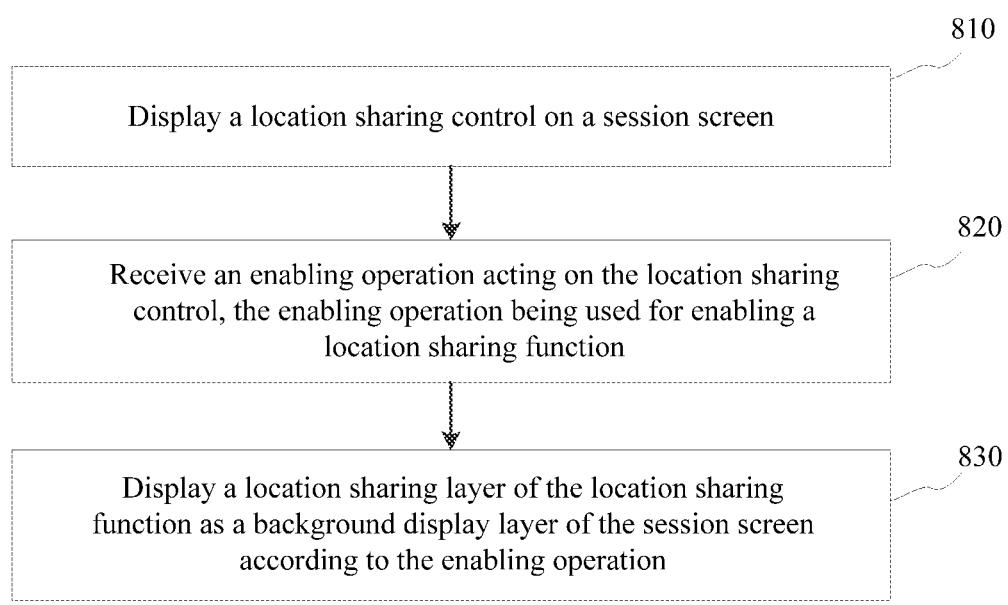
FIG. 8 is a schematic diagram of a session screen according to another embodiment of the present disclosure.

Based on the embodiments described above, FIG. 8 is a flowchart of a screen display method according to another embodiment of the present disclosure. The method includes the following steps.

Step 810. Display a location sharing control on a session screen.

Optionally, the location sharing control may be an enabling option that is of a location sharing function and that is located in an extended content bar on the session screen, or may be a location sharing message on the session screen. The extended content bar is used to present an extended function of an instant messaging client. The location sharing message is a message sent by at least one session user on the session screen, and used for enabling the location sharing function at a local end.

The session screen includes a message display layer and a background display layer, the message display layer is located above the background display layer, and the message display layer is used for displaying a session message between a local user and another session user. Schematically, referring to FIG. 2, the session screen includes the message display layer and the background display layer. The message display layer displays a session message "where are you?". The background display layer is an empty display layer below the message display layer.

Step 820. Receive an enabling operation acting on the location sharing control, the enabling operation being used for enabling a location sharing function.

In an example, when the location sharing control is the enabling option that is of the location sharing function and that is located in the extended content bar, the receiving, by a terminal, an enabling operation acting on the location sharing control includes: receiving a viewing operation acting on the session screen, and displaying the extended content bar according to the viewing operation; and receiving the enabling operation acting on the enabling option that is of the location sharing and that is in the extended content bar. Optionally, the terminal generates the enabling instruction after receiving the enabling operation. Optionally, if other terminals on the session screen have not enabled the location sharing function, the terminal sends a location sharing message to the terminals used by other session users in a session group.

Referring to a session screen shown in FIG. 2, after the session user taps a control 21 that is on the session screen and that is used for displaying the extended content bar, the terminal presents the extended content bar 22. The terminal receives an enabling operation acting on an enabling option 23 that is of the location sharing function and that is in the extended content bar 22.

In another example, when the location sharing control is a location sharing message on the session screen, the terminal receives the enabling operation of the location sharing function, including: receiving an enabling operation acting on the location sharing message on the session screen. It should be noted that at least one session user on the session screen has enabled the location sharing function.

Referring to a session screen shown in FIG. 3, the terminal receives an enabling operation acting on a location sharing message 31.

Step 830. Display a location sharing layer of the location sharing function as a background display layer of the session screen according to the enabling operation.

The location sharing layer being used for sharing and displaying a geographical location of a local session user and/or a geographical location of another session user on a map.

Optionally, the location sharing layer is used for sharing and displaying the geographical location of the local session user and/or the geographical location of the another session user on a two-dimensional map or a three-dimensional map. Optionally, the geographical location is a real-time geographical location, and the real-time geographical location is a geographical location obtained by locating the terminal in real time. Optionally, the geographical location is a static geographical location, and the static geographical location is a geographical location obtained by enabling the location sharing function to locate the terminal. Optionally, to identify the geographical location of the local session user and/or the geographical location of the another session user, the location sharing layer further includes an identifier corresponding to the geographical location of the local session user (for example, a profile photo of the local session user), and/or an identifier corresponding to the geographical location of the another session user (for example, a profile photo of the another session user).

Optionally, the terminal generates the enabling instruction after receiving the enabling operation. After generating the enabling instruction, the terminal may generate the location sharing layer by invoking a page generation control, where the page generation control is used for generating the location sharing layer according to a map obtained by a map obtaining interface. The page generation control may be WebView or View. The map obtaining interface may be a MapQuest JavaScript Application Programming Interface (API)), a Google Maps JavaScript API, or a Bing Maps JavaScript API. This is not limited by the disclosed embodiments.

In some embodiments, the location sharing layer is displayed as the background display layer of the session screen, and because the background display layer of the session screen is located under the message display layer, the terminal can simultaneously display the session message and the map. In this way, a session user can not only view a map, but also chat with another session user, so that resources of the terminal are saved, and efficiency of chatting by the session user by using the session screen is improved.

The message display layer may be a transparent layer, and when there is a session message on session screen, the session message is attached to the transparent layer. Alternatively, the message display layer may be a fragment corresponding to each display element, for example, a fragment corresponding to a session message, a fragment corresponding to a session title, and a fragment corresponding to an input box. The fragment is used for independently deploying each display element on the session screen.

The displaying, by the terminal, the location sharing layer as a background display layer of a session screen includes: invoking a preset screen setting interface, the screen setting interface being used for setting the background display layer of the session screen; and setting, by using the screen setting interface, the location sharing layer as the background display layer for displaying. The screen setting interface may be a ListView interface, an ImageView interface, a ScrollView interface, and the like. This is not limited by the disclosed embodiments.

Referring to a session screen shown in FIG. 4, the terminal displays a location sharing layer 41 as the background display layer on the session screen, and a session message 42 on the message display layer is above the location sharing layer 41.

In conclusion, according to the method provided in some embodiments, when a location sharing function is enabled, a generated location sharing layer is displayed as a background display layer of a session screen, where a message display layer of the session screen is above the background display layer, so that an instant messaging client can simultaneously display a geographical location on the location sharing layer and a session message on the message display layer, and a problem that a terminal consumes many resources when the terminal can display only a location sharing screen or the session screen and needs to switch a current screen back and forth can be resolved. Therefore, the resources of the terminal can be saved, and a session user does not need to continuously switch between the location sharing screen and the session screen, thereby improving efficiency of instant chatting by the session user on the session screen.

Optionally, after step 830, the terminal may further receive the first user operation acting on the session screen; and display the location sharing layer above the message display layer according to the first user operation. For a related description of some embodiments, refer to steps 501 and 502 in the embodiment shown in FIG. 5, and details are not described herein again.

Optionally, after displaying the location sharing layer above the message display layer according to the first user operation, the terminal may further receive a second user operation acting on the location sharing layer; and re-display the location sharing layer as the background display layer of the session screen according to the second user operation. For a related description of some embodiments, refer to steps 506 and 507 in the embodiment shown in FIG. 5, and details are not described herein again.

Optionally, after displaying the location sharing layer above the message display layer according to the first user operation, the terminal may further receive a third user operation acting on the location sharing layer; and disable the location sharing layer and display the session screen according to the third user operation. The third user operation may be an operation of tapping a disable option set on the map sharing layer, and in this case, the terminal needs to display the disable option on the location sharing layer. For example, the third user operation may be an operation of tapping a "disable" option 64 in FIG. 6, or may be a touch and hold operation. This is not limited by the disclosed embodiments. It should be noted that, the third user operation is an operation different from the second user operation, and a difference may be reflected in different acting positions or different operation execution manners. This is not limited by the disclosed embodiments.

Figure 9:
FIG. 9 is a schematic diagram of a session screen according to another embodiment of the present disclosure.
Figure 10:
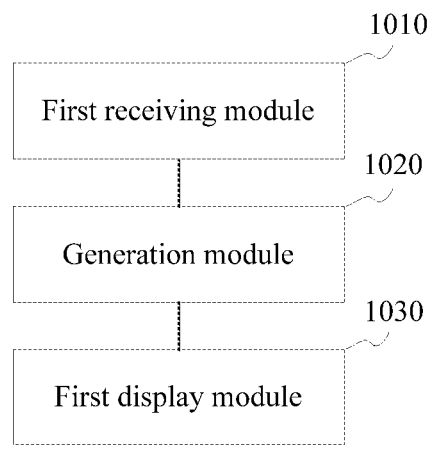
FIG. 10 is a block diagram of a screen display apparatus according to an embodiment of the present disclosure.

FIG. 9 is a schematic diagram of a screen display method according to an embodiment of the present disclosure. After an enabling option 931 of a location sharing function is displayed in an extended content bar on a session screen, and a terminal receives an enabling operation acting on an enabling option 931, the terminal displays a location sharing layer of the location sharing function as a background display layer of the session screen. Then, the terminal receives a first user operation, and displays the location sharing layer above the message display layer. The location sharing layer displays a return option 932 and a disable option 933. If receiving a second trigger operation acting on the return option 932, the terminal re-displays the location sharing layer as the background display layer of the session screen; and if the terminal receives a third trigger operation acting on the disable option 933, the terminal disables the location sharing layer and displays the message display layer.

The following is apparatus embodiments of the present disclosure, which can be used to perform the method embodiments of the present disclosure. For details not disclosed in the apparatus embodiments of the present disclosure, refer to the method embodiments of the present disclosure.

FIG. 1010 is a block diagram of a screen display apparatus according to an embodiment of the present disclosure. The apparatus has functions of the foregoing method examples. The functions may be implemented by using hardware, or may be implemented by hardware executing corresponding software. The apparatus is used in a terminal.

The apparatus may include: a first receiving module 1010, a generation module 1020, and a first display module 1030.

The first receiving module 1010 is configured to perform step 101.

The generation module 1020 is configured to perform step 102.

The first display module 1030 is configured to perform step 103.

Optionally, the first display module 1030 includes an invoking unit and a display unit.

The invoking unit is configured to invoke a preset screen setting interface, the screen setting interface being an interface used for setting the background display layer of the session screen.

The display unit is configured to set, by using the screen setting interface invoked by the invoking unit, the location sharing layer as the background display layer for displaying.

Optionally, the apparatus further includes: a second receiving module and a second display module.

The second receiving module is configured to perform step 501.

The second display module is configured to perform step 502.

Optionally, the second display module includes a hiding unit.

The hiding unit is configured to hide all display elements on the message display layer under the background display layer according to the first user operation.

Optionally, the second display module includes an adding unit.

The adding unit is configured to place the location sharing layer above the message display layer according to the first user operation.

Optionally, the first user operation is a user operation acting on an empty area of the message display layer, and the empty area is an area that is of the message display layer and that is not covered by the session message; and the first user operation is a user operation acting on the background display layer.

Optionally, the apparatus further includes: a third receiving module and/or a fourth receiving module and/or a fifth receiving module.

The third receiving module is configured to perform step 503.

The fourth receiving module is configured to perform step 504.

The fifth receiving module is configured to perform step 505.

Optionally, the apparatus further includes: a sixth receiving module and a third display module.

The sixth receiving module is configured to perform step 506.

The third display module is configured to perform step 507.

For related details, refer to the foregoing method embodiments.

Figure 11:
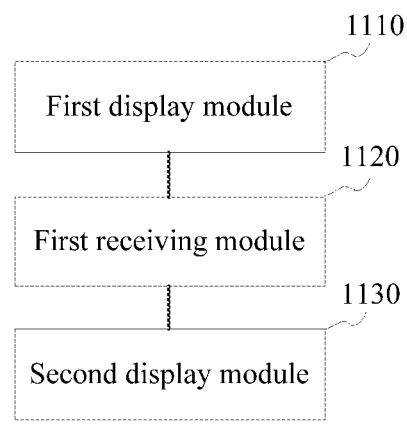
FIG. 11 is a block diagram of a screen display apparatus according to an embodiment of the present disclosure.

FIG. 11 is a block diagram of a screen display apparatus according to an embodiment of the present disclosure. The apparatus has functions of the foregoing method examples. The functions may be implemented by using hardware, or may be implemented by hardware executing corresponding software. The apparatus is used in a terminal. The apparatus may include: a first display module 1110, a first receiving module 1120, and a second display module 1130.

The first display module 1110 is configured to display a location sharing control on a session screen, the session screen including a message display layer and a background display layer, the message display layer being located above the background display layer, and the message display layer being used for displaying a session message between a local user and another session user.

The first receiving module 1120 is configured to receive an enabling operation acting on the location sharing control, the enabling operation being used for enabling a location sharing function.

The second display module 1130 is configured to display a location sharing layer of the location sharing function as the background display layer of the session screen according to the enabling operation, the location sharing layer being used for sharing and displaying a geographical location of the local session user and/or a geographical location of the another session user on a map.

Optionally, the apparatus further includes: a second receiving module and a third display module.

The second receiving module is configured to receive a first user operation acting on the session screen.

The third display module is configured to display the location sharing layer above the message display layer according to the first user operation.

Optionally, the first user operation is a user operation acting on an empty area of the message display layer, and the empty area is an area that is of the message display layer and that is not covered by the session message; and the first user operation is a user operation acting on the background display layer.

Optionally, the apparatus further includes: a third receiving module and a fourth display module.

The third receiving module is configured to receive a second user operation acting on the location sharing layer.

The fourth display module is configured to re-display the location sharing layer as the background display layer of the session screen according to the second user operation.

Optionally, the third receiving module includes: a first display unit and a first receiving unit.

The first display unit is configured to display a return option on the location sharing layer.

The first receiving unit is configured to receive the second user operation acting on the return option.

Optionally, the apparatus further includes: a fourth receiving module and a fifth display module.

The fourth receiving module is configured to receive a third user operation acting on the location sharing layer.

The fifth display module is configured to disable the location sharing layer and display the session screen according to the third user operation.

Optionally, the fourth receiving module includes: a second display unit and a second receiving unit.

The second display unit is configured to display a disable option on the location sharing layer.

The second receiving unit is configured to receive the third user operation acting on the disable option.

For related details, refer to the foregoing method embodiments.

It should be noted that: when the apparatus provided in the foregoing embodiment implements the functions of the apparatus, only division of the foregoing function modules is used as an example for description. In the practical application, the functions may be allocated to and completed by different function modules according to requirements. That is, an internal structure of the device is divided into different function modules, to complete all or some of the functions described above. In addition, the apparatus and method embodiments provided in the foregoing embodiments belong to one conception. For the specific implementation process, refer to the method embodiments, and details are not described herein again.

Figure 12:
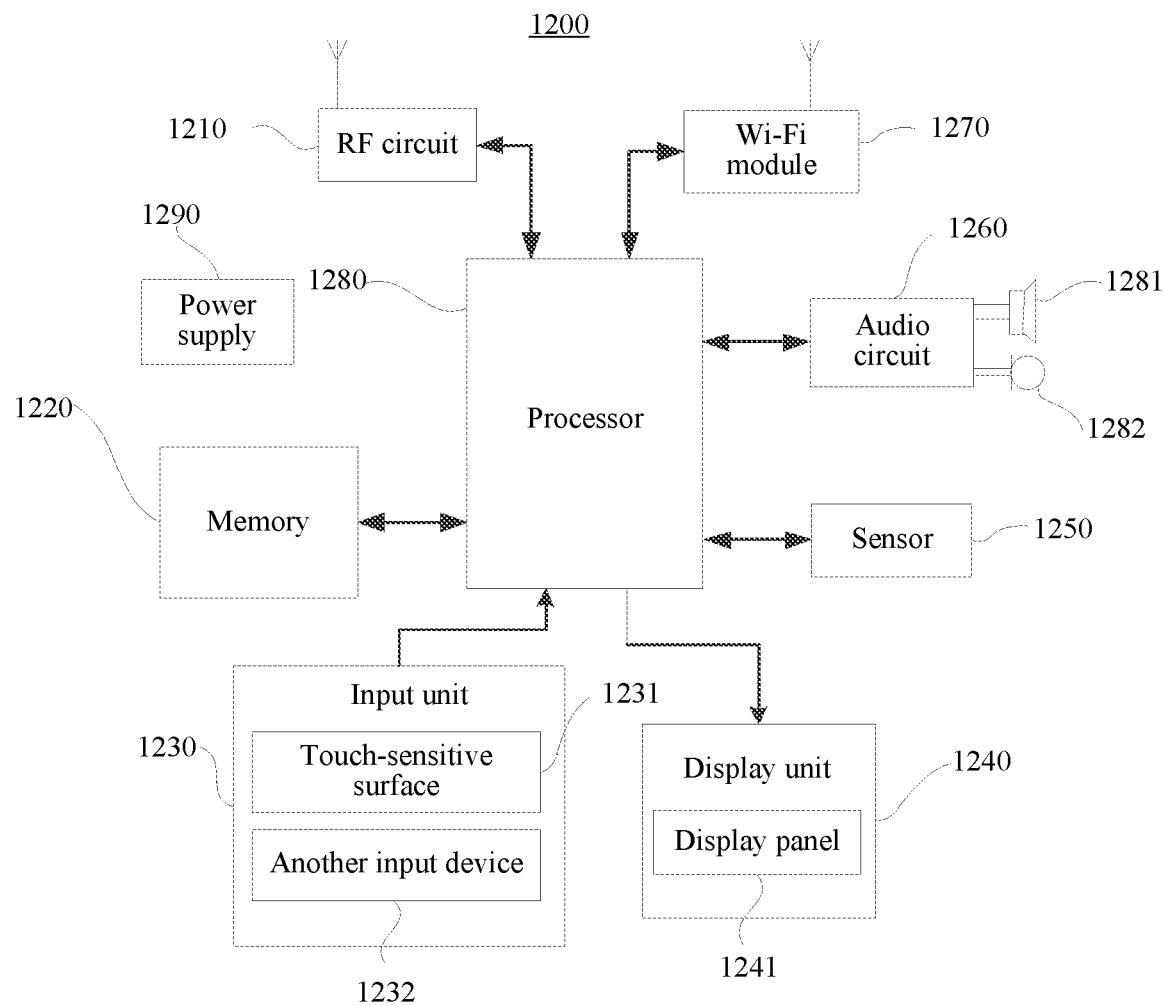
FIG. 12 is a schematic structural diagram of a terminal according to an embodiment of the present disclosure.

FIG. 12 is a schematic structural diagram of a terminal according to an embodiment of the present disclosure. The terminal 1200 is configured to implement the screen display method provided in the foregoing embodiments. Specifically:

The terminal 1200 may include components such as a radio frequency (RF) circuit 1210, a memory 1220 including one or more computer readable storage mediums, an input unit 1230, a display unit 1240, a sensor 1250, an audio circuit 1260, a Wireless Fidelity (Wi-Fi) module 1270, a processor 1280 including one or more processing cores, and a power supply 1290. A person skilled in the art may understand that the structure of the terminal shown in FIG. 12 does not constitute a limitation on the terminal, and the terminal may include more components or fewer components than those shown in the figure, or some components may be combined, or a different component deployment may be used.

The RF circuit 1210 may be configured to receive and send signals during an information receiving and sending process or a call process. Particularly, the RF circuit receives downlink information from a base station, then delivers the downlink information to one or more processors 1280 for processing, and sends related uplink data to the base station. Generally, the RF circuit 1210 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 1210 may also communicate with a network and another device through wireless communication. The wireless communication may use any communication standard or protocol, including but not limited to, Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 1220 may be configured to store a software program and module. The processor 1280 runs the software program and module stored in the memory 1220, to implement various functional applications and data processing. The memory 1220 may mainly include a program storage area and a data storage area. The program storage area may store an operating system, an application program required by at least one function (for example, a sound playing function and an image playing function), or the like. The data storage area may store data (for example, audio data and a phone book) created according to use of the terminal 1200. In addition, the memory 1220 may include a high-speed random access memory, and may further include a non-volatile memory such as at least one magnetic disk storage device or a flash memory device, or another volatile solid storage device. Correspondingly, the memory 1220 may further include a memory controller, to provide access of the processor 1280 and the input unit 1230 to the memory 1220.

The input unit 1230 may be configured to receive input digit or character information, and generate a keyboard, mouse, joystick, optical, or track ball signal input related to the user setting and function control. Specifically, the input unit 1230 may include an image input device 1231 and another input device 1232. The image input device 1231 may be a camera, or may be a photoelectric scanning device. In addition to the image input device 1231, the input unit 1230 may further include the another input device 1232.

Specifically, the another input device 1232 may include, but is not limited to, one or more of a physical keyboard, a functional key (such as a volume control key or a switch key), a track ball, a mouse, and a joystick.

The display unit 1240 may be configured to display information input by the user or information provided for the user, and various graphical user interfaces of the terminal 1200. These graphical user interfaces may include a graph, text, an icon, a video and any combination thereof. The display unit 1240 may include a display panel 1241. Optionally, the display panel 1241 may be configured by using a liquid crystal display (LCD), an organic light-emitting diode (OLED), or the like.

The terminal 1200 may further include at least one sensor 1250 such as an optical sensor, a motion sensor, and other sensors. Specifically, the optical sensor may include an ambient light sensor and a proximity sensor. The ambient light sensor may adjust luminance of the display panel 1241 according to brightness of the ambient light. The proximity sensor may switch off the display panel 1241 and/or backlight when the terminal 1200 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 1200, are not further described herein.

The audio circuit 1260, a speaker 1281, and a microphone 1282 may provide audio interfaces between the user and the terminal 1200. The audio circuit 1260 may convert received audio data into an electrical signal and transmit the electrical signal to the speaker 1281. The speaker 1281 converts the electrical signal into a sound signal for output. On the other hand, the microphone 1282 converts a collected sound signal into an electrical signal. The audio circuit 1260 receives the electrical signal, converts the electrical signal into audio data, and outputs the audio data to the processor 1280 for processing. Then, the processor 1280 sends the audio data to, for example, another terminal by using the RF circuit 1210, or outputs the audio data to the memory 1220 for further processing. The audio circuit 1260 may further include an earplug jack, to provide communication between a peripheral earphone and the terminal 1200.

Wi-Fi belongs to a short distance wireless transmission technology. The terminal 1200 may help, by using the Wi-Fi module 1270, a user to receive and send an email, browse a web page, access stream media, and the like. This provides wireless broadband Internet access for the user. Although FIG. 12 shows the Wi-Fi module 1270, it may be understood that the Wi-Fi module 1270 is not a necessary component of the terminal 1200, and the Wi-Fi module 1270 may be omitted as required provided that the scope of the essence of the present disclosure is not changed.

The processor 1280 is the control center of the terminal 1200, and is connected to various parts of the mobile phone by using various interfaces and lines. By running or executing the software program and/or module stored in the memory 1220, and invoking data stored in the memory 1220, the processor 1280 performs various functions and data processing of the terminal 1200, thereby performing overall monitoring on the mobile phone. Optionally, the processor 1280 may include one or more processing cores. Preferably, the processor 1280 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1280.

The terminal 1200 further includes the power supply 1290 (such as a battery) for supplying power to the components. Preferably, the power supply may be logically connected to the processor 1280 by using a power management system, thereby implementing functions such as charging, discharging, and power consumption management by using the power management system. The power supply 1290 may further include one or more of a direct current power supply or an alternating current power supply, a re-charging system, a power failure detection circuit, a power supply converter or inverter, a power supply state indicator, and any other component.

Although not shown in the figure, the terminal 1200 may further include a Bluetooth module and the like. Details are not further described herein.

In a specific embodiment, a non-transitory computer readable storage medium including instructions, for example, a memory including instructions, is further provided, and the foregoing instructions may be executed by the processor of the terminal 1200 to complete the foregoing method. For example, the non-transitory computer readable storage medium may be a ROM, a random access memory (RAM), a CD-ROM, a magnetic tape, a floppy disk, an optical data storage device, or the like. When the instructions in the storage medium is executed by the processor of the terminal 1200, the non-transitory computer readable storage medium enables the terminal 1200 to perform the foregoing method.

This application provides a computer-readable storage medium. The computer-readable storage medium stores a program instruction, and the screen display method provided in the various method embodiments is implemented when the program instruction is executed by a processor.

It should be understood that "plurality of" mentioned in the specification means two or more. "And/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

The sequence numbers of the preceding embodiments of the present disclosure are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of the embodiments of the present disclosure, and are not intended to limit the embodiments of the present disclosure. Any modification, equivalent replacement, improvement, or the like made within the spirit and principle of the embodiments of the present disclosure shall fall within the protection scope of the embodiments of the present disclosure.

What is claimed is:

1. A screen display method, comprising:
 receiving, by a terminal, an enabling instruction for activating a location sharing function;
 generating, by the terminal, a location sharing layer according to the enabling instruction, the location sharing layer being used for sharing and displaying, on a map, a geographical location of at least one user in a dialogue session;
 displaying, by the terminal, the location sharing layer as a background display layer of a session screen corresponding to the dialogue session, the session screen including a message display layer and the background display layer, the message display layer being located on top of at least a portion of the background display layer, and the message display layer being used for displaying a session message between a local user of the terminal and a remote user participated in the dialogue session;
 receiving a user operation performed on the session screen; and
 displaying the location sharing layer on top of at least a portion of the message display layer according to the user operation.

2. The method according to claim 1, wherein the displaying the location sharing layer as a background display layer of a session screen comprises:
 invoking a preset screen setting interface for setting the background display layer of the session screen; and
 setting, by using the screen setting interface, the location sharing layer as the background display layer.

3. The method according to claim 1, wherein the displaying the location sharing layer on top of at least the portion of the message display layer according to the user operation comprises:
 hiding all display elements on the message display layer under the background display layer according to the user operation.

4. The method according to claim 1, wherein the displaying the location sharing layer on top of at least the portion of the message display layer according to the user operation comprises:
 placing the location sharing layer on top of at least the portion of the message display layer according to the user operation.

5. The method according to claim 1, wherein the first user operation is performed on an empty area of the message display layer, and the empty area is not covered by the session message; or the user operation is a user operation performed on the background display layer.

6. The method according to claim 1, wherein after the displaying the location sharing layer on top of at least the portion of the message display layer according to the user operation, the method further comprises:
 receiving a map dragging operation; and
 displaying a dragged map on the location sharing layer according to the map dragging operation.

7. The method according to claim 1, wherein after the displaying the location sharing layer on top of at least the portion of the message display layer according to the user operation, the method further comprises:
 receiving a map zoom-in operation; and
 zooming in, according to the map zoom-in operation, a scale of the map displayed on the location sharing layer.

8. The method according to claim 1, wherein after the displaying the location sharing layer on top of at least the portion of the message display layer according to the user operation, the method further comprises:
 receiving a map zoom-out operation; and
 zooming out, according to the map zoom-out operation, a scale of the map displayed on the location sharing layer.

9. The method according to claim 1, wherein after the displaying the location sharing layer on top of at least the portion of the message display layer according to the user operation, the method further comprises:
 receiving a second user operation performed on the location sharing layer; and
 re-arranging the location sharing layer as the background display layer of the session screen according to the second user operation.

10. The method according to claim 1, further comprising:
 receiving a new message from the remote user in the dialogue session; and
 displaying the new message on top of at least a portion of the location sharing layer while at least a portion of the message displayer layer is underneath the location sharing layer.

11. The method according to claim 1, wherein generating the location sharing layer includes:
 displaying an extended content bar on a display screen of the terminal, the extended content bar including a location-displaying button; and
 displaying on the message display layer, upon activation of the location-displaying button, a notification message directed to the remote user in the dialogue session, the notification message notifying the remote user on location-sharing.

12. A screen display apparatus, comprising: a memory; and a processor coupled to the memory and configured to perform:
 receiving an enabling instruction for activating a location sharing function;
 generating a location sharing layer according to the enabling instruction, the location sharing layer being used for sharing and displaying, on a map, a geographical location of at least one user in a dialogue session;
 displaying the location sharing layer as a background display layer of a session screen corresponding to the dialogue session, the session screen including a message display layer and the background display layer, the message display layer being located on top of at least a portion of the background display layer, and the message display layer being used for displaying a session message between a local user of the screen display apparatus and a remote user participated in the dialogue session;
 receiving a user operation performed on the session screen; and
 displaying the location sharing layer on top of at least a portion of the message display layer according to the user operation.

13. The apparatus according to claim 12, wherein the displaying the location sharing layer as a background display layer of a session screen comprises:
 invoking a preset screen setting interface for setting the background display layer of the session screen; and
 setting, by using the screen setting interface, the location sharing layer as the background display layer.

14. The apparatus according to claim 12, wherein the displaying the location sharing layer on top of at least the portion of the message display layer according to the user operation comprises:

hiding all display elements on the message display layer under the background display layer according to the user operation.

15. The apparatus according to claim 12, wherein the displaying the location sharing layer on top of at least the portion of the message display layer according to the user operation comprises:
 placing the location sharing layer on top of at least the portion of the message display layer according to the user operation.

16. The apparatus according to claim 12, wherein the user operation is a user operation performed on an empty area of the message display layer, and the empty area is not covered by the session message; or the user operation is a user operation performed on the background display layer.

17. The apparatus according to claim 12, wherein after the displaying the location sharing layer on top of at least the portion of the message display layer according to the user operation, the processor is further configured to perform:
 receiving a map dragging operation; and
 displaying a dragged map on the location sharing layer according to the map dragging operation.

18. The apparatus according to claim 12, wherein after the displaying the location sharing layer on top of at least the portion of the message display layer according to the user operation, the processor is further configured to perform:
 receiving a map zoom-in operation; and
 zooming in, according to the map zoom-in operation, a scale of the map displayed on the location sharing layer.

19. The apparatus according to claim 12, wherein after the displaying the location sharing layer on top of at least the portion of the message display layer according to the user operation, the processor is further configured to perform:
 receiving a map zoom-out operation; and
 zooming out, according to the map zoom-out operation, a scale of the map displayed on the location sharing layer.

20. A non-transitory computer-readable storage medium storing computer program instructions executable by at least one processor to perform:
 receiving an enabling instruction for activating a location sharing function;
 generating a location sharing layer according to the enabling instruction, the location sharing layer being used for sharing and displaying, on a map, a geographical location of at least one user in a dialogue session;
 displaying the location sharing layer as a background display layer of a session screen corresponding to the dialogue session, the session screen including a message display layer and the background display layer, the message display layer being located on top of at least a portion of the background display layer, and the message display layer being used for displaying a session message between a local user and a remote user participated in the dialogue session;
 receiving a user operation performed on the session screen; and
 displaying the location sharing layer on top of at least the portion of the message display layer according to the user operation.

* * * * *